United States Patent [19]

van Duynhoven

[11] 4,031,923

[45] June 28, 1977

[54] WARP TENSION CONTROLLER

[75] Inventor: Adrianus Henricus van Duynhoven, Deurne, Netherlands

[73] Assignee: Ruti-Te Strake B.V., Deurne, Netherlands

[22] Filed: Dec. 18, 1975

[21] Appl. No.: 641,987

[30] Foreign Application Priority Data

Feb. 25, 1975 Netherlands ............... 7502246

[52] U.S. Cl. ................... 139/97; 139/110; 66/211; 242/75.51
[51] Int. Cl.² ........................ D03D 49/06
[58] Field of Search ........... 139/97, 99, 100, 109, 139/110, 115, 108, 1 R; 66/86 H, 86 J, 210, 211; 242/75.51

[56] References Cited

UNITED STATES PATENTS

| | | | |
|---|---|---|---|
| 3,072,154 | 1/1963 | Locher | 139/110 |
| 3,125,127 | 3/1964 | Locher | 139/97 |
| 3,223,906 | 12/1965 | Dinger | 242/75.51 X |
| 3,749,331 | 7/1963 | Nedreski | 242/75.51 |
| 3,802,467 | 4/1974 | Steverlynck | 139/108 |

FOREIGN PATENTS OR APPLICATIONS

| | | | |
|---|---|---|---|
| 1,099,725 | 1/1968 | United Kingdom | 139/110 |
| 130,603 | 12/1959 | U.S.S.R. | 139/97 |

Primary Examiner—James Kee Chi
Attorney, Agent, or Firm—Marshall & Yeasting

[57] ABSTRACT

A warp tension controller for a loom comprises a warp tension sensor for generating a first signal which is a measure of the warp tension, a source of a reference signal, and means for comparing said signals and producing an output signal representing deviation of said first signal from said reference signal. An operational amplifier has an inverting input connected to receive said output signal, and has an output connected to means for adjusting the warp tension. A feedback circuit connected between said input and said output of said amplifier comprises a resistor in parallel to an integrating capacitor. A voltage memory having an input connected to the output of said amplifier produces a sustained output voltage equal to the voltage applied to its input when the loom is running, and a switch during slower than normal operation of the loom connects a relatively small resistance between the input and the output of said amplifier, disconnects said capacitor from the output of said amplifier and connects it to the output of said voltage memory, to apply to said capacitor a voltage equal to the voltage which existed at the output of said amplifier when the loom was running at its normal operating speed.

2 Claims, 1 Drawing Figure

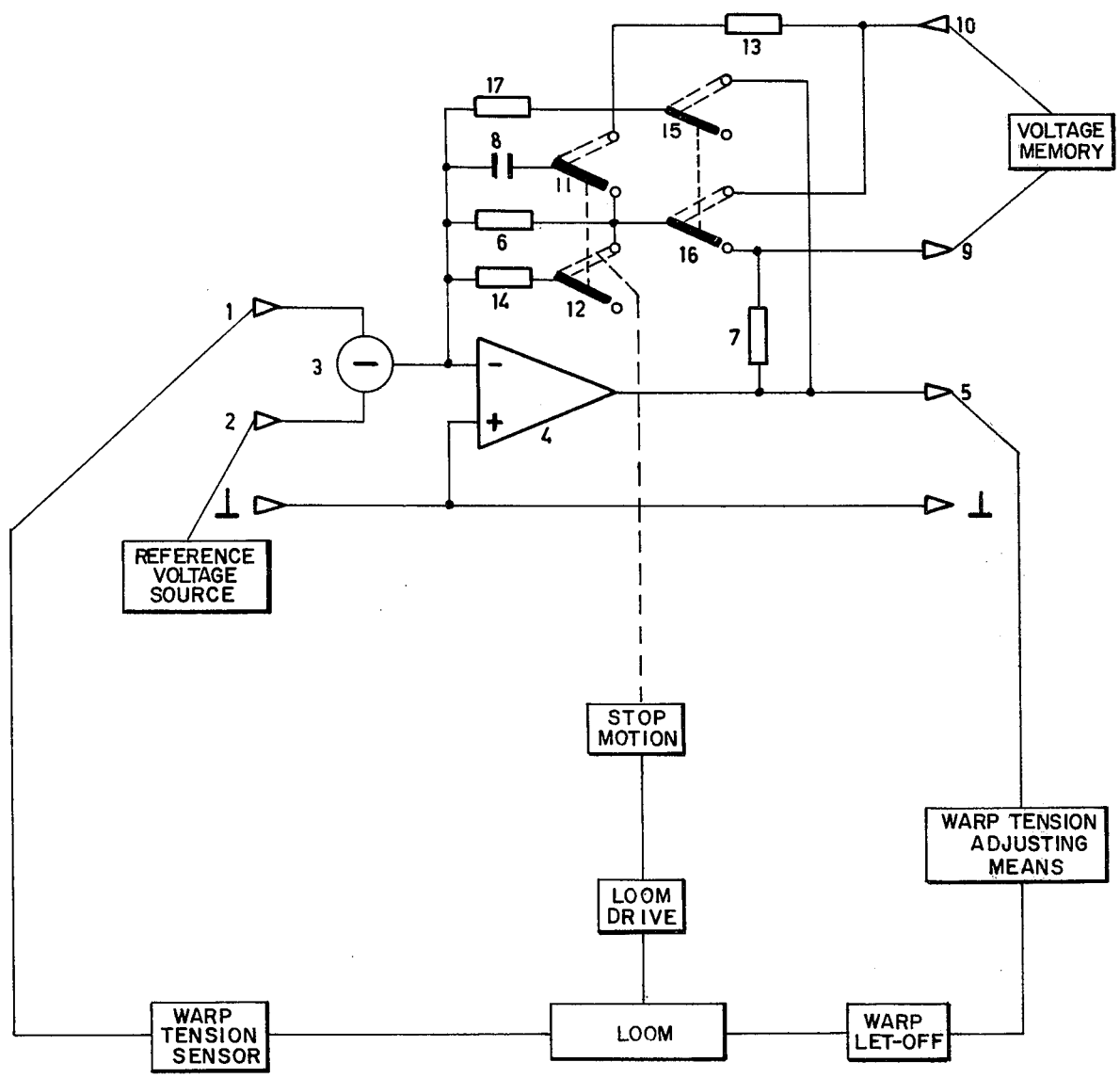

WARP TENSION CONTROLLER

BACKGROUND OF THE INVENTION

The invention relates to a warp tension controller for a loom, with means for comparing a measuring quantity which is related to the warp tension and a reference quantity, which through an operational amplifier connected as a PI controller, with a feedback circuit comprising a resistor in parallel to an integrating capacitor, controls an adjusting means for the warp tension.

Since in a weaving loom, the warp tension varies not only at short term by the shaft movements, but also varies at long term by the nature of the warp yarn which is handled, the decreasing diameter of the warp beam and other circumstances, whereas for a good quality of the fabric, the warp tension must be maintained as constant as possible, modern looms make use of automaic warp tension controllers, comprising a servo loop in which a sensor for the warp tension, a reference adjusting means, a comparing means for the output signals of these two, an operational amplifier and a control means are connected. The control means usually affects the drive speed of the warp beam, and for obtaining a smooth and stable control, the controller is usually designed as a PI controller, i.e. a controller with proportional as well as integrating action, for which purpose the feedback circuit of the operational amplifier comprises a resistor as well as a capacitor. The integrating part of the operation of the operational amplifier ensures that the warp tension control hardly responds at all to the rapid fluctuations of the warp tension, caused by the shaft movements, which fluctuations are too fast for tension control.

During operation, the integrating capacitor in the feedback circuit carries a D.C. voltage corresponding to the average output signal of the operational amplifier. If the loom is stopped, an entirely different condition of the warp yarn is obtained mechanically, dependent upon the arbitrary position in which the loom comes to a standstill, so that the D.C. voltage across the integrating capacitor assumes a totally different value than during operation. Nevertheless, as soon as possible, after starting up, the original D.C. voltage across the integrating capacitor should again be reached, in order that the condition of normal operation be regained as soon as possible.

If the yarns on a warp beam are almost used up, that warp beam must be replaced by a new warp beam, after which the yarns of the new warp beam are knotted to the ends of the warp yarns of the woven fabric, and the loom is slowly turned until all knots have passed through the shafts successfully. During this slow turning of the loom, an integrating operation of the warp tension controller is undesirable. Nevertheless, already during the slow turning of the loom, the voltage across the integrating capacitor of the operational amplifier should be brought to the value which will later occur, after a switch-over from slow turning of the loom to the normal operational speed has occurred. Otherwise, at the transition to the norma- operational speed, when the integrating capacitor is again introduced in the feedback circuit of the operational amplifier, a control transient would occur due to the charging of the integrating capacitor.

SUMMARY OF THE INVENTION

The invention aims at providing a warp tension controller of the kind referred to, which meets these requirements.

For that purpose, a warp tension controller according to the invention is characterized by a switch which during the turning at low speed of the loom bridges the feedback circuit with a small resistor and switches the integrating capacitor from the output of the operational amplifier to the output of a voltage memory, the input of which is connected to the output of the operational amplifier.

The voltage memory, which can e.g. consist of a voltage divider with adjustable tap, connected across a reference voltage, the adjustable tap being so driven by a servo motor that its voltage always corresponds to the output voltage of the operational amplifier, and the position of which is fixed as soon as the loom does not operate at normal speed, ensures that a voltage corresponding to the mean value of the voltage across the integrating capacitor is continuously available for keeping the integrating capacitor charged to that voltage, even if it is removed from the feedback circuit for preventing an integrating operation of the operational amplifier. Since removing the integrating action of the operating amplifier brings about the risk that the control action becomes too agressive, the gain of the operational amplifier should be decreased upon disconnecting the integrating capacitor from the feedback circuit, for which purpose the feedback circuit is bridged by a small resistor.

BRIEF DESCRIPTION OF THE DRAWING

The drawing is a circuit diagram of a warp tension controller embodying the invention

DESCRIPTION OF THE PREFERRED EMBODIMENT

The output of a warp tension sensor, which provides a voltage which is related to the warp tension, is connected to the input 1, while a reference voltage source is connected to the terminal 2. The terminals 1 and 2 are connected to the inputs of a comparing circuit 3, the output of which is connected to the inverting input of an operational amplifier 4, the non-inverting input of which is grounded. Between the output 5 of the operational amplifier and its inverting input, a feedback network is connected, comprising the resistors 6 and 7 and an integrating capacitor 8. The ganged switches 11 and 12, except during standstill of the loom, are always in the position shown in solid lines. The input of a voltage memory is connected at 9 and the output of the voltage memory is connected at 10. As long as the ganged switches 15 and 16 are in the position shown in solid lines, the operational amplifier 4 operates as the usual proportional and integrating controller, the voltage across the integrating capacitor 8 through the terminal 9 constantly being applied to the input of the voltage memory, which provides a corresponding voltage to the terminal 10. If the loom is slowly turned, the ganged switches 15 and 16 are moved over first to the positions shown in shadow lines, whereby the integrating capacitor 8 and the resistor 6 are disconnected from the feedback network and are connected to the terminal 10 of the output of the voltage memory. The voltage memory then keeps the voltage across the integrating capacitor 8 constant, even though that capacitor has been disconnected from the feedback circuit of the operational amplifier 4. Since after removal of the integrating action of the integrating capacitor 8, a high gain of the operational amplifier 4 is undesirable, a small resistor 17 is connected in the feedback circuit by means of the switch 15, whereby the gain of the operational amplifier 4 is made relatively small. When it is intended to change from turning at low speed to operation at normal speed, the ganged switches 15 and 16 are again moved to the position shown in solid lines whereupon the resistor 17 is removed from the feedback circuit and the integrating capacitor 8 and the resistor 6 are again connected in the feedback circuit. At that instant, the integrating capacitor 8 has already been brought to the desired voltage by means of the output of the voltage memory, which is connected to the terminal 10, so that the change-over occurs without control transients caused by charging the integrating capacitor 8.

The resistors 13 and 14 are connected only during standstill of the loom, when the ganged automatic switches 11 and 12 are in the positions shown in shadow lines.

I claim:

1. A warp tension controller for a loom, comprising a warp tension sensor for generating a first signal which is a measure of the warp tension, a source of a reference signal, means for comparing said signals and producing an output signal representing deviation of said first signal from said reference signal, an operational amplifier having an inverting input connected to receive said output signal, and having an output connected to means for adjusting the warp tension, and a feedback circuit connected between said input and said output of said amplifier, comprising a resistor in parallel to an integrating capacitor, wherein the improvement comprises a voltage memory having an input connected to the output of said amplifier, for producing a sustained output voltage equal to the voltage applied to its input when the loom is running, and a switch which during slower than normal operation of the loom connects a relatively small resistance between the input and the output of said amplifier, disconnects said capacitor from the output of said amplifier and connects it to the output of said voltage memory, to apply to said capacitor a voltage equal to the voltage which existed at the output of said amplifier when the loom was running at its normal operating speed.

2. A warp tension controller for a loom, comprising a warp tension sensor for generating a first signal which is a measure of the warp tension, a source of a reference signal, means for comparing said signals and producing an output signal representing deviation of said first signal from said reference signal, an operational amplifier having an inverting input connected to receive said output signal, and having an output connected to means for adjusting the warp tension, and a feedback circuit connected between said input and said output of said amplifier, comprising a resistor in parallel to an integrating capacitor, wherein the improvement comprises a voltage memory having an input connected to the output of said amplifier, for producing a sustained output voltage equal to the voltage applied to its input when the loom is running and a switch which, while the loom is stopped, disconnects said capacitor from the output of said amplifier and connects it to the output of said voltage memory, to apply to said capacitor a voltage equal to the voltage which existed at the output of said amplifier when the loom was running.

* * * * *